United States Patent
Fardin et al.

(10) Patent No.: US 7,012,521 B2
(45) Date of Patent: Mar. 14, 2006

(54) DEVICE AND METHOD FOR POSITIONING

(75) Inventors: Rahim Fardin, Dietikon (CH); Fabian Ochsner, Nussbaumen (CH)

(73) Assignee: RUAG Electronics, Bern (CH)

(*) Notice: Subject to any disclaimer, the term of this patent is extended or adjusted under 35 U.S.C. 154(b) by 132 days.

(21) Appl. No.: 10/717,358

(22) Filed: Nov. 19, 2003

(65) Prior Publication Data

US 2004/0113805 A1 Jun. 17, 2004

(30) Foreign Application Priority Data

Dec. 6, 2002 (CH) .................................. 2076/02

(51) Int. Cl.
*G08B 1/08* (2006.01)

(52) U.S. Cl. .......................... 340/539.13; 340/539.16; 340/539.22

(58) Field of Classification Search .......... 340/539.13, 340/539.11, 539.16, 539.22, 572.1, 573.1, 340/825.36, 825.49, 10.1, 10.31, 10.4; 367/117, 367/129, 903

See application file for complete search history.

(56) References Cited

U.S. PATENT DOCUMENTS

| | | | | |
|---|---|---|---|---|
| 3,696,384 A | * | 10/1972 | Lester | ......................... 367/199 |
| 5,504,477 A | * | 4/1996 | Whitright et al. | .......... 340/10.4 |
| 5,831,937 A | | 11/1998 | Weir et al. | ................... 367/128 |
| 6,141,293 A | * | 10/2000 | Amorai-Moriya et al. | .. 367/127 |
| 6,317,386 B1 | * | 11/2001 | Ward | .......................... 367/127 |
| 6,731,198 B1 | * | 5/2004 | Stobbe et al. | ............. 340/10.33 |

FOREIGN PATENT DOCUMENTS

| | | |
|---|---|---|
| EP | 0 233 472 | 7/1988 |
| EP | 0 836 069 B1 | 4/1998 |
| EP | 1 128 153 A1 | 12/2002 |
| FR | 2 631 454 | 11/1989 |
| GB | 2 170 907 A | 8/1986 |
| WO | WO 95/14241 | 5/1995 |

OTHER PUBLICATIONS

European Search Report for Serial No. EP 03 02 3368 dated Mar. 23, 2004.

* cited by examiner

*Primary Examiner*—Toan N. Pham

(74) *Attorney, Agent, or Firm*—McCormick, Paulding & Huber LLP

(57) ABSTRACT

Device and method for positioning of a moving object in a monitorable region using a stationary monitoring system and a transponder attached to the moving object. Furthermore, the monitoring system contains at least two sensor units and an analysis unit, which allow distance values (Dx) to be established using travel time measurement of ultrasound signals (US) and positioning to be performed therefrom.

15 Claims, 5 Drawing Sheets

DEVICE AND METHOD FOR POSITIONING

The present application claims the priority of the Swiss Patent Application No. 2002 2076/02 filed 6 Dec. 2002 and incorporates it by reference herein.

The present invention relates to a device and method for positioning of a moving object in a monitorable region using a stationary monitoring system and a transponder attached to the moving object.

BACKGROUND OF THE INVENTION

There are various systems which allow the position of an object or person to be monitored. Further systems are in development.

Differentiation is made between autonomous systems, which are constructed in such a way that they detect an object or person from its own parts and are able to establish its position without having to interact with a communication means located on the object or person for this purpose, and those systems which are semi-autonomous. A semi-autonomous system is distinguished in that the object or the person has a communication means.

GPS based systems, for example, are used in open country for positioning. However, systems of this type are not suitable for use in buildings.

The simulation of various mission scenarios is especially important for the education and training of special forces. Systems are available which, for example, are applied in military fields, but also in other fields. One example is the SIMLAS® system from Oerlikon Contraves AG. SIMLAS is a trademark of this company. The SIMLAS® system is distinguished in that a person is equipped with a belt system which includes a body belt and a helmet belt. Communication means are attached to this belt system which are able to emit and receive information.

A belt system for combat purposes having multiple elements, such as light detectors, a laser transmitter, and a control unit, is known from European Patent 0836069 B1. This known system includes multiple belts, provided with electrical components, which exchange information signals with a central unit via ultrasound or radio. A belt system which is based on that described in the European Patent is, for example, known from the European Patent Application having the title "Belt System for Identification Purposes". This European Patent Application was published under the number EP 1128153 A1.

It is the object of the present invention to make known systems usable in connection with positioning.

This object is advantageously achieved according to the present invention by a device for positioning according to claim 1 and by a method for positioning according to claim 10.

Other advantageous embodiments of the present invention result from the further dependent claims.

BRIEF DESCRIPTION OF THE FIGURES

The present invention is described in greater detail on the basis of the drawing in the following for exemplary purposes.

DETAILED DESCRIPTION OF THE INVENTION

In the following, the present invention is described in greater detail on the basis of several figures.

Figure 1:
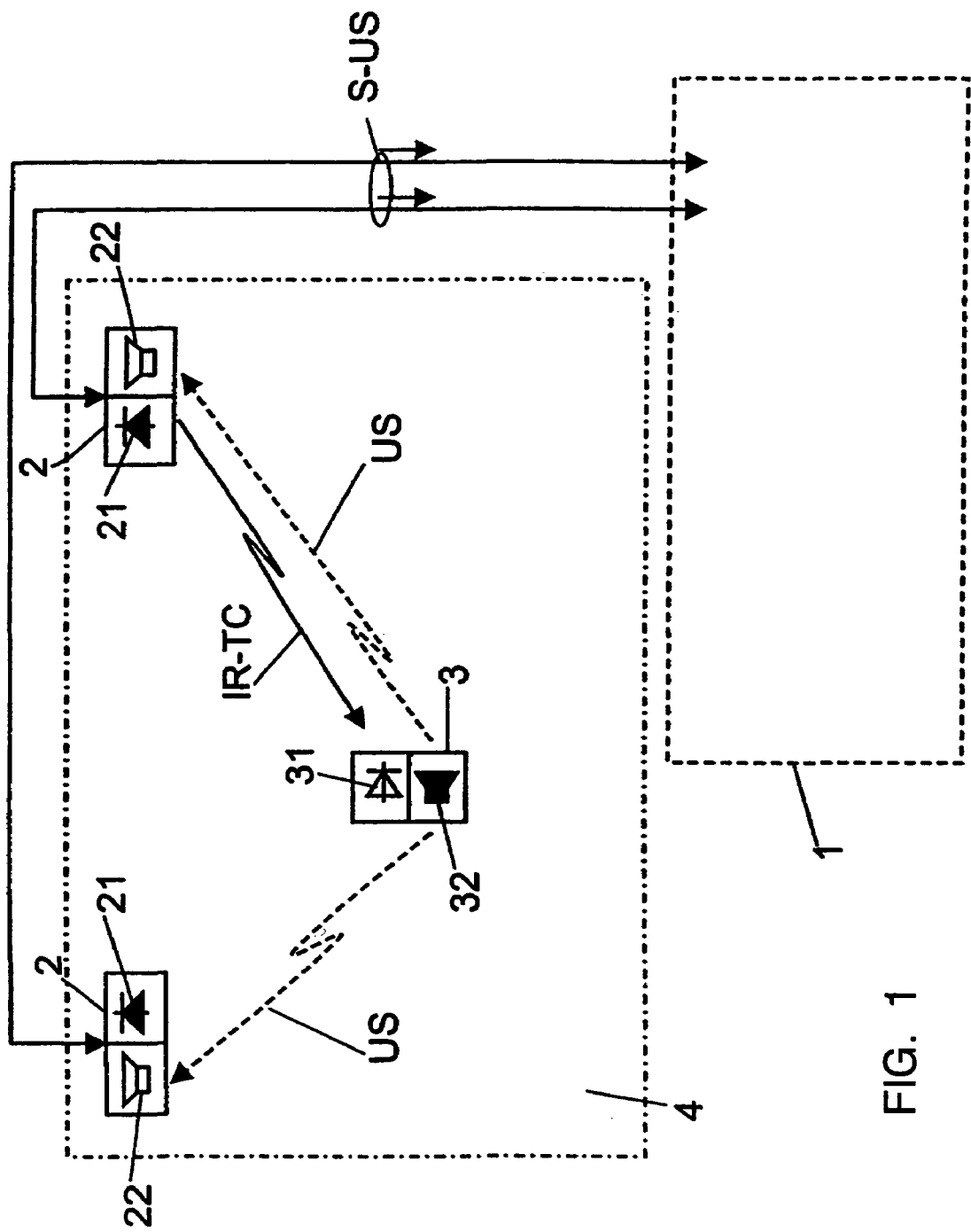
FIG. 1 shows a schematic illustration of a first device for positioning having a monitoring system, an analysis unit, a transponder, and the corresponding signal connections.

FIG. 1 schematically shows a first device according to the present invention for positioning of a moving object. In this case, the object, which may be a person, a vehicle, or another mobile device, is located in a monitorable region 4. To establish the spatial position of the object, it is equipped with a transponder 3 which includes an infrared receiver 31 and an ultrasound transmitter 32. It is obvious that the transponder 3 also includes further means for power supply and for coordinating the components 31 and 32 just cited (not shown in FIG. 2). The device according to the present invention also includes a stationary monitoring system having at least two sensor units 2 and an analysis unit 1. In this case, the sensor units 2 each include an infrared transmitter 21 and ultrasound receiver 22. The monitoring system is laid out in this case in such a way that the following signal connections are possible.

A start signal S-TC triggers the emission of an infrared trigger signal IR-TC, which may be received by the infrared receiver 31 of the transponder 3, at one of the two sensor units 2 or at both sensor units 2. As a reaction to the received infrared trigger signal IR-TC, the ultrasound transmitter 32 of the transponder 3 immediately transmits back an ultrasound signal US, which may be received by the ultrasound receivers 22 of the two sensor units. Immediately after the ultrasound signal US is received, each of the sensor units 2 transmits a stop signal S-US to the analysis unit 1. The analysis unit 1 may now determine the position of the transponder 3, and therefore the position of the object, on the basis of the time differences between the start signal S-TC and the corresponding stop signals S-US. This may preferably be performed using a triangulation method. In other words, using the device according to the present invention, the travel times of the ultrasound signal US between the transponder 3 and the sensor units 2 are established, the travel times able to be processed further into a statement of position of the object. In this case, the significant difference between the propagation speeds of the electromagnetic signals IR-TC and S-US and the ultrasound signal US are exploited, a precise determination of the travel times of the ultrasound signals US being possible using simple means.

Figure 2:
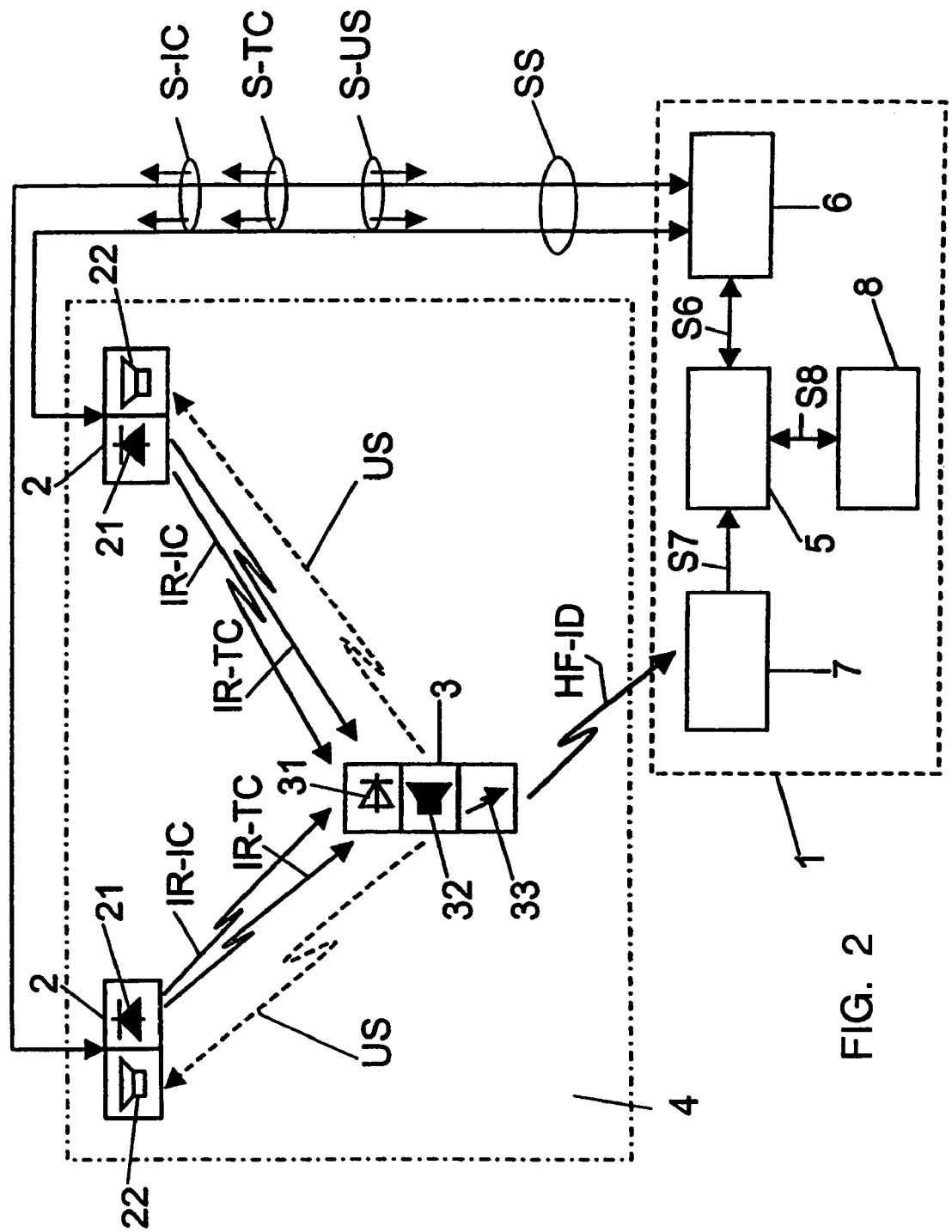
FIG. 2 shows a schematic illustration of a second device for positioning having a monitoring system, an analysis unit, a transponder, and the corresponding signal connections.

FIG. 2 schematically shows a further device according to the present invention for positioning of a moving object. To establish the spatial position of the object, it is equipped with a transponder 3 which includes an infrared receiver 31 and an ultrasound transmitter 32. Optionally, the transponder may also include a radio transmitter 33. It is obvious that the transponder 3 may also include further means for power supply and for coordinating the components 31 and 32 just cited (not shown in FIG. 2). The device according to the present invention also includes a stationary monitoring system having at least two sensor units 2 and an analysis unit 1. In this case, the sensor units 2 each include an infrared transmitter 21 and an ultrasound receiver 22. The monitoring system is laid out in this case in such a way that the following signal connections are possible.

The analysis unit 1 transmits a start signal S-TC simultaneously to the sensor units 2. This signal is designed in this case in such a way that upon receipt by the sensor units 2, an infrared trigger signal IR-TC, which may be received by the infrared receiver 31, is immediately emitted from the infrared transmitter 21. As a reaction to the received infrared trigger signal IR-TC, the ultrasound transmitter 32 immediately emits an ultrasound signal US which may be received by the ultrasound receiver 22. Immediately after the ultrasound signal US is received, each of the sensor units 2 transmits a stop signal S-US to the analysis unit 1. The analysis unit 1 may now determine the position of the transponder 3, and therefore the position of the object, on the basis of the time differences between the simultaneously transmitted start signal S-TC and the corresponding stop signals S-US. In other words, using the device according to the present invention, the travel times of the ultrasound signal US between the transponder 3 and the sensor units 2 are established, the travel times able to be processed further into a statement of position of the object. In this case, at the significant difference between the propagation speeds of the electromagnetic signals S-TC, IR-TC, and S-US and the ultrasound signal US are exploited, a precise determination of the travel times of the ultrasound signals US being possible using simple means.

The device for positioning according to the present may also include multiple objects, each having a transponder 3 attached to the object. In this way, the positions of multiple objects located in the monitorable region 4 may be determined. The transponder 3 may also be part of a belt system, which is known from the European Patent Application 1128153 A1 cited at the beginning.

The analysis unit 1 includes at least one control unit 6, a computing unit 5, a visualization unit 8, and a radio receiver 7. In this case, the components 5 through 8 cited are connected in the following way: the control unit is connected via a connection S6 to the computing unit 5 and the control unit 6 is also connected to the sensor units 2 via connections SS. The computing unit 5 is also connected to the visualization unit 8 via a connection S8 and to the radio receiver 7 via a connection S7.

In this case, the components 5 through 8 perform the following functions in the example shown: as the higher-order unit, the computing unit 5 assumes the management, the control, the data registration, the position calculation, and finally the administration of the positions of all moving objects which are located in the monitorable region 4. The control unit 6 processes control commands of the computing unit 5 and causes the emission of the start signal S-TC as a reaction, or, for example, the emission of a search signal S-IC, which is used for identifying objects located in the monitorable region 4. As a further function, the control unit 6 determines the time differences between the emitted start signal S-TC and the corresponding received stop signals S-US and converts these time differences into corresponding distance values Dx. These distance values Dx are subsequently transferred to the computing unit 5 for further processing. The visualization unit 8 graphically represents the positions obtained from the computing unit 5, on a display, for example. In this case, for example, both the instantaneous positions as well as the preceding positions may be shown in relation to the geometry of the monitorable region 4.

The radio receiver 7 may receive radio signals HF-ID, which include an object identification number IDx, for example, and relays the object identification numbers IDx obtained therewith to the computing unit 5 for further processing.

In a further embodiment of the present invention, the transponder 3 includes a radio transmitter 33, the radio transmitter 33 being wirelessly connectable to the radio receiver 7. This radio connection allows the transmission of the object identification number IDx, which is used for identifying an object located in the monitorable region 4.

In a further embodiment, the control unit 6 may be provided as a plug-in module or as a plug-in card in the computing unit 5. In this case, multiple control units 6 may be provided, in order to thus be able to elevate the number of connected sensor units 2. This is used for spatial expansion of the monitorable region 4 and/or to increase the number of detectable stop signals S-US, which may cause improvement of the positioning precision.

In a further embodiment, the connections SS between the sensor units 2 and the analysis unit 1, and/or the control unit 6, may be wireless connections or wire-bound connections. Examples of wire-bound connections are metallic conductors, which may also be used for the power supply of the sensor units 2, or glass optical fibers. Examples of wireless connections are radio connections or optical directional beam connections. The means for transmission necessary for this purpose are not shown in FIG. 2, since these means are not relevant to the present invention. Means of this type may, for example, be constructed or assembled from standard components.

In a preferred embodiment, the sensor units 2 are laid out in such a way that they emit an infrared burst of higher energy than the infrared trigger signal IR-TC in order to ensure that all transponders 3 located in the monitorable region may be addressed.

The device according to the present invention may be laid out in such a way that it is usable in a closed space or building. The immediate surroundings of a building may also be monitored using the device according to the present invention, the transmitter powers and/or reception sensitivities having to be selected accordingly.

A person whose position is to be detected according to the present invention is preferably equipped with a SIMLAS® belt system, which has a body belt and a helmet belt, as explained in the introductory part of this description. The SIMLAS® belt system may be adapted appropriately using hardware or software in order to allow smooth integration into the system according to the present invention.

Figure 3:
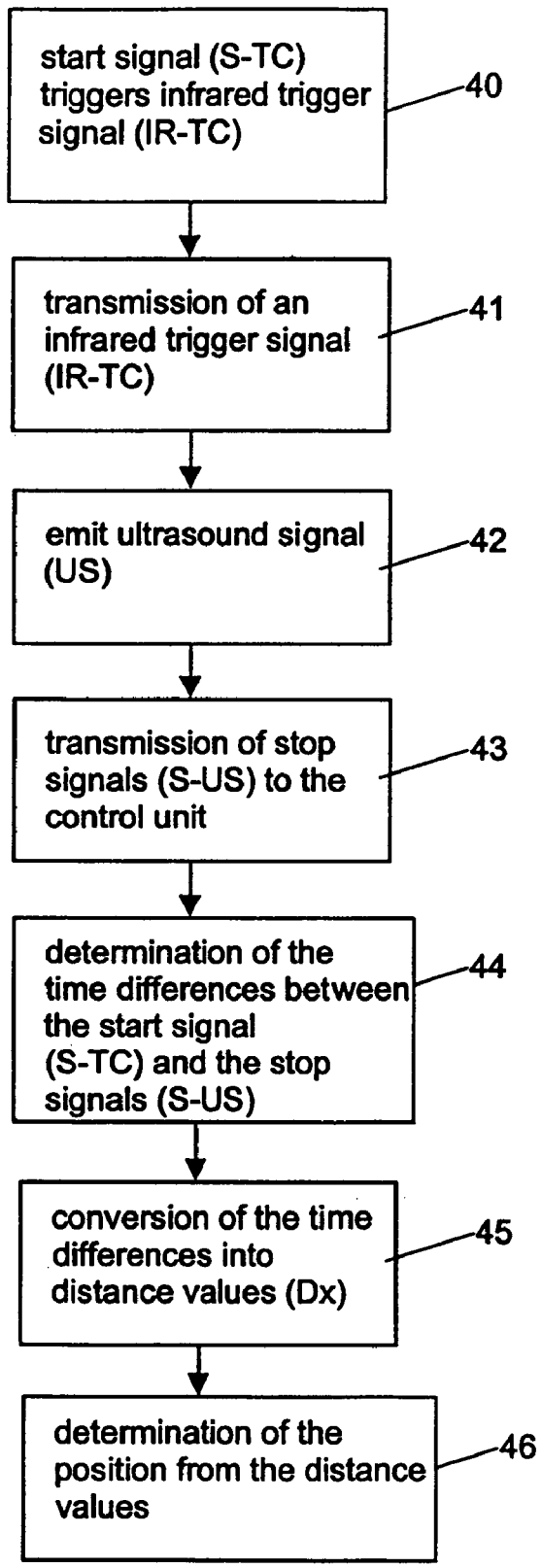
FIG. 3 shows a schematic flowchart of a first method according to the present invention.

In the following, a first method for positioning of a moving object in a monitorable region 4 according to the present invention is described. This method is schematically shown in FIG. 3. The method for positioning is executed in a system which includes a transponder 3 attachable to the moving object and a monitoring system having at least two sensor units 2. The following method steps are executed:

steps 40, 41: emission of an infrared signal (IR-TC) by at least one of the two sensor units (2) as a reaction to a start signal (S-TC);
  step 42: transmission of an ultrasound signal (US) using an ultrasound transmitter (32), which is part of the transponder (3), as a reaction to the infrared trigger signal (IR-TC);
  step 43: transmission of a stop signal (S-US) by each of the two sensor units (2) to a control unit (6) as a reaction to the received ultrasound signal (US);
  step 44: determination of the time differences between the start signal (S-TC) and the stop signals (S-US) by the control unit (6);

step 45: conversion of the time differences into distance values (Dx) between the transponder (3) and the sensor units (2), the distance values (Dx) corresponding to the travel times of the ultrasound signal (US); and step 46: determination of the position of the moving object.

In the following, a further method for positioning of a moving object in a monitorable region 4 according to the present invention is described. In this case, the computing unit 5 takes the selected object identification number IDx from a list 10 and causes the control unit 6 to transmit the start signal S-TC to the sensor units 2 simultaneously. In this case, the start signal S-TC may include a trigger code and the selected object identification number IDx, for example. The list 10 includes all object identification numbers IDx of objects which are instantaneously located in the monitorable region 4 in this case. As a reaction to the start signal S-TC, the sensor units 2 emit the infrared trigger signal IR-TC, which includes the trigger code contained in the corresponding start signal S-TC and the selected object identification number IDx. In this case, the infrared trigger signal IR-TC may be received by multiple infrared receivers 31 and therefore by multiple transponders 3. Each of the transponders 3 addressed now checks the received object identification number IDx with its own object identification number. If the object identification numbers IDx correspond, the ultrasound signal US is emitted by the relevant transponder 3 as a reaction. In contrast, if the object identification numbers IDx do not correspond, no ultrasound signal US is emitted in this embodiment. Therefore, interference between multiple simultaneously emitted ultrasound signals US is avoided. The emitted ultrasound signal US is now received by the sensor units 2 at different points in time, corresponding to the different travel times, and, as a reaction of the sensor units 2, directly transmitted as the corresponding stop signals S-US to the analysis unit 1, and/or to the control unit 6. The control unit 6 now establishes the time differences between the simultaneously transmitted start signal S-TC and the stop signals S-US arriving at different times. Subsequently, the time differences established are converted into corresponding distance values Dx and transmitted to the computing unit 5 for positioning.

Figure 4:
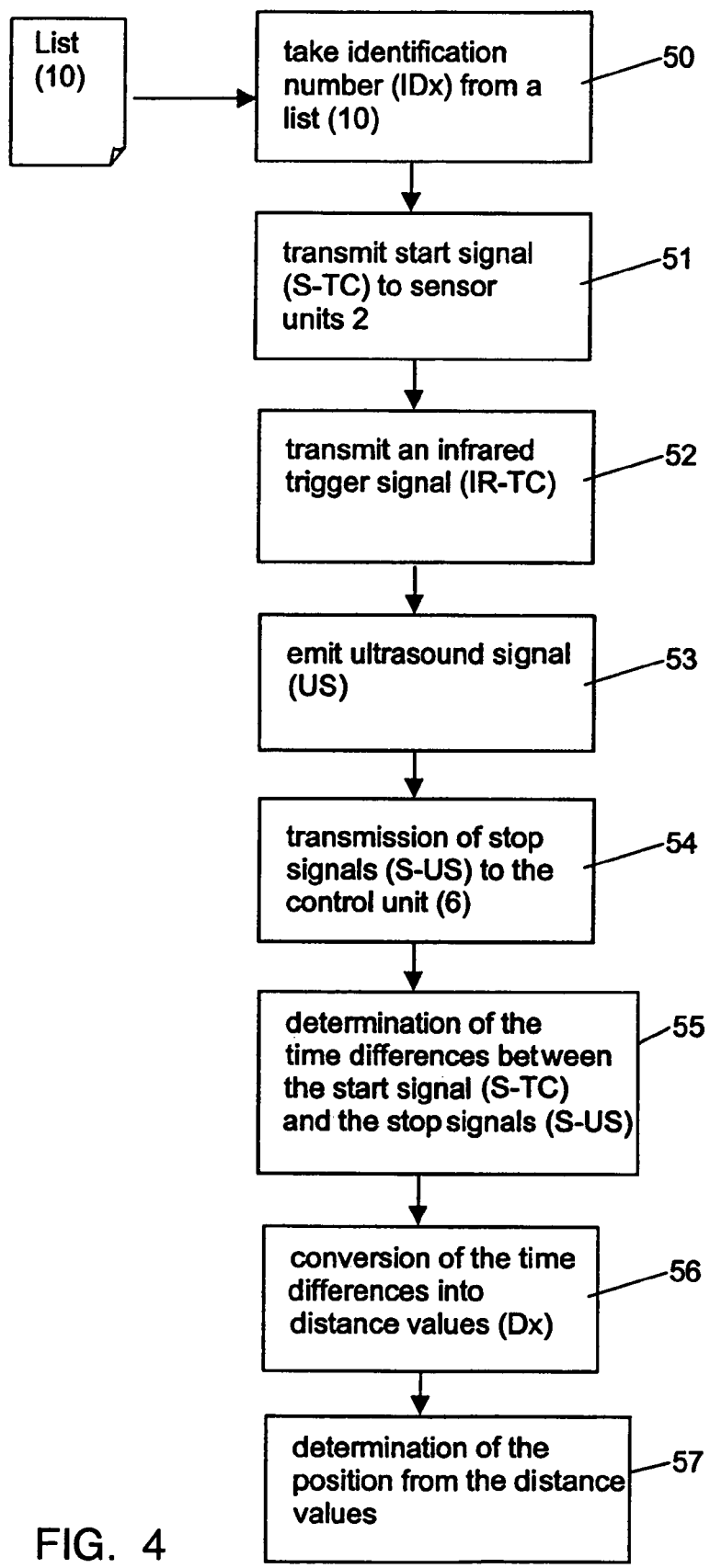
FIG. 4 shows a schematic flowchart of a second method according to the present invention.

This exemplary method is shown in FIG. 4 and is explained in the following with reference to FIG. 4. In a first method step 50, an object identification number (IDx) is selected from a list 10. The control unit 6 is then caused to transmit a start signal (S-TC) to a sensor unit 2 in a step 51. The sensor units 2 transmit an infrared trigger signal (IR-TC) into the region to be monitored as a reaction to the start signal (S-TC) in a step 52. In a further step 53, an ultrasound signal (US) is emitted by the ultrasound transmitter 32 as a reaction to the infrared trigger signal (IR-TC). The sensor units 2 subsequently each transmit a stop signal (S-US) to the control unit 6 as a reaction to the received ultrasound signal (US) in step 54. In step 55, the control unit 6 determines the time differences between the start signal (S-TC) and the stop signals (S-US). Now, in step 56, the time differences are converted into distance values (Dx). In this case, these are the distance values (Dx) between the transponder (3) and the sensor units (2). The distance values (Dx) are established from the travel times of the ultrasound signal US. In a further step 57, the position in the monitored region is established from the distance values established.

In a further method according to the present invention, the list 10 is generated in the following way: using control commands, the computing unit 5 causes the control unit 6 to periodically transmit the search signal S-IC to the sensor units 2. The sensor units 2 emit an infrared search signal IR-IC as a reaction through the IR transmitters 21, which may be received by one or more of the transponders 3 located in the monitorable region 4 via the IR receiver 31. As a reaction, the transponder 3 emits a radio signal HF-ID through the radio transmitter 33, which may, for example, include the object identification number IDx associated with the transponder 3. The radio receiver 7 receives the radio signal HF-ID and subsequently relays the received object identification number IDx to the computing unit 5 for preparation of the list 10. In other words, through the periodically emitted search signals S-IC, the objects located in the monitorable region 4 are identified and their object identification numbers IDx are entered in the list 10. In this way, the number and identity of the objects which are located in the monitorable region 4 are known at any time. Therefore, in this embodiment, it is a dynamically generated and administrated list 10. To avoid interference which could result through time overlap of multiple radio signals HF-ID, a suitable signal protocol may be applied for time staggering of the radio signals HF-ID, for example.

In a further method according to the present invention, the distance values Dx established by the control unit 6 are differentiated by the computing unit 5 into real distance values, obtained through direct sight connection between transponder 3 and sensor units 2, and unreal distance values, obtained through reflections. The differentiation may be performed, for example, in that distance values which are obviously too large, which do not correspond to the spatial dimensions of the monitorable region 4, are eliminated. In this case, preferably only distance values identified as real are used to calculate the position.

In a further method according to the present invention, the position in relation to a coordinate system (an XYZ coordinate system, for example), which covers the monitorable region 4, is calculated by the control unit 5. Using known mathematical triangulation methods, one or more possible positions may be calculated from the knowledge of the location coordinates of the stationary sensor units 2 and the established real distance values Dx. In this case, from multiple calculated possible positions, those which have the smallest spatial distance to the last known position are selected for representation.

The method according to the present invention, and/or the analysis unit 1, may be designed in such a way that it is even possible to track people or objects which move from one region into another region, for example, from one room into a neighboring room. A transition protocol may be provided in order to allow rapid, smooth transition.

Figure 5:
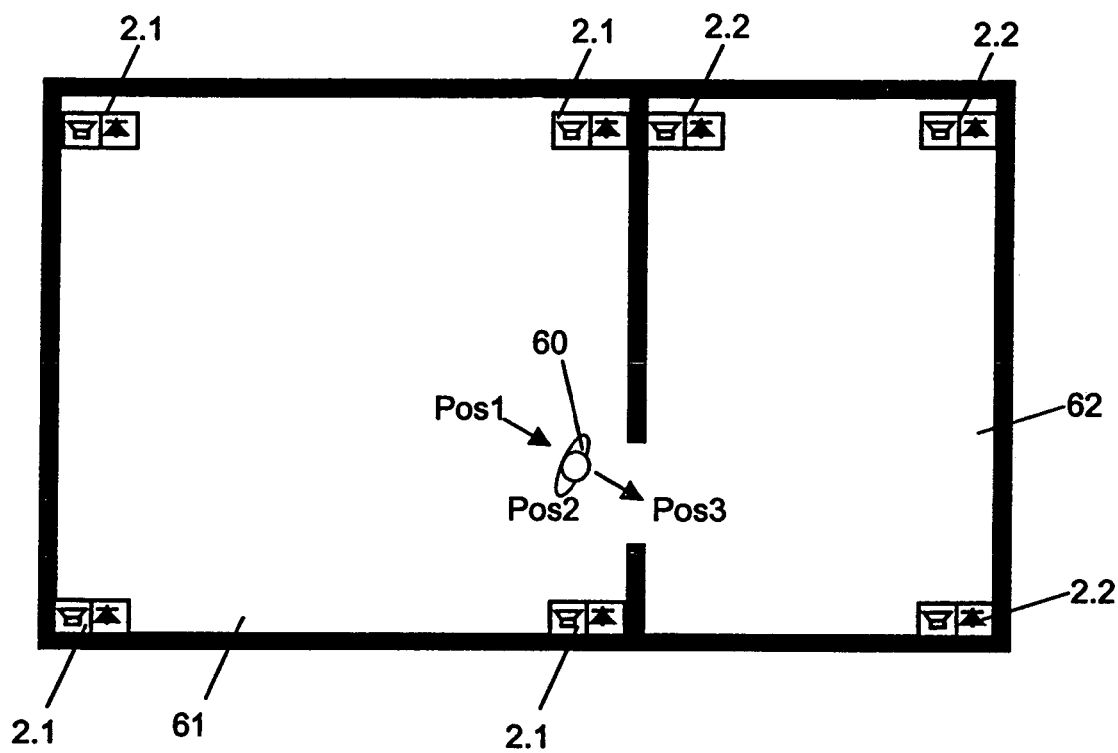
FIG. 5 shows a schematic illustration of a monitorable region, which is divided into two zones, having a person who wears a transponder (not visible).

A schematic illustration of a monitorable region, which is divided into two zones, room 61 and room 62, is shown in FIG. 5. A person 60 is located in the room 61. The person 60 wears a transponder (e.g., transponder 3, which is not visible in FIG. 5). An illustration of this type may, for example, be displayed on the display of the visualization unit 8. The room 61 includes four sensor units 2.1 and the room 62 includes three sensor units 2.2. The analysis unit is preferably constructed in such a way that a "forward-looking" algorithm may be applied for the positioning, which precalculates an expected position (e.g., position Pos3) from the previous positions (e.g., positions Pos1 and Pos2) of an object 60 moving in the monitoring region. For this precalculation, for example, the movement direction and the movement speed of the particular object may be taken into consideration. This "forward-looking" algorithm allows seamless, rapid changeover upon the transition from the room 61 into the room 62. Preferably, a transition protocol is applied, which, together with the "forward-looking" algorithm, ensures a rapid changeover. This is an important feature of the present invention.

A part of the steps or all steps which run in the analysis unit 1 may be implemented using suitable software, which controls the hardware of the analysis unit 1 appropriately.

The present invention is especially suitable for the training and the simulation of combat missions or other missions of special forces, such as firefighters, rescue parties, security personnel, police forces, and the like. In the training or during the simulation, the particular situation and every movement of the special forces may therefore be displayed on the visualization unit 8. Storage media may be provided in order to be able to record the execution for later analysis.

A device according to the present invention may also, however, be used in situations which require special monitoring. Examples are: airport buildings, banks, power plants, and other security zones. For such a use, the device is permanently or temporarily in use and may, for example, allow a commander to monitor and instruct and/or direct special forces. For this purpose, the special forces must be equipped with transponders (in the form of a helmet belt, for example).

It is an advantage of the present invention that resolution in the centimeter range is possible.

What is claimed is:

1. A device for positioning of a moving object having a monitoring system and a transponder, attachable to the moving object, which includes an infrared receiver and an ultrasound transmitter, the monitoring system having an analysis unit and at least two sensor units, which are connectable to the analysis unit and include an infrared transmitter and an ultrasound receiver, an infrared trigger signal (IR-TC) able to be emitted, which triggers the emission of an ultrasound signal (US) by the ultrasound transmitter, the ultrasound signal (US) being receivable by the ultrasound receivers and the positioning of the moving object able to be performed by the analysis unit using travel time determination of the ultrasound signal (US).

2. The device for positioning according to claim 1, wherein the positioning of the moving object is performed in a monitorable region.

3. The device for positioning according to claim 1, wherein the monitoring system is laid out in such a way that a start signal (S-TC) transmitted from the analysis unit to the sensor units causes the emission of the infrared trigger signal (IR-TC) by at least one of the infrared transmitters, the infrared trigger signal (IR-TC) being receivable by the infrared receiver.

4. The device for positioning according to claim 3, wherein the sensor units trigger stop signals (S-US) as a reaction to the received ultrasound signal (US), which may be transmitted by the sensor units to the analysis unit in such a way that time differences between a start signal (S-TC), which triggers the emission of the infrared trigger signal (IR-TC), and the stop signals (S-US) are analyzed for the positioning of the transponder.

5. The device for positioning according to claim 4, wherein multiple moving objects, each having a transponder attached to the object, are provided in the monitoring space.

6. The device for positioning according to claim 1, wherein the analysis unit includes at least one control unit, a computing unit, a visualization unit, and a radio receiver, the at least one control unit being connectable to the computing unit, the computing unit being connectable to the visualization unit, and the radio receiver being connectable to the computing unit.

7. The device for positioning according to claim 6, wherein the transponder includes a radio transmitter for transmitting an object identification number (IDx), the radio transmitter being wirelessly connectable to the radio receiver.

8. The device for positioning according to claim 6, wherein the at least one control unit is provided as at least one plug-in module in the computing unit.

9. The device for positioning according to claim 6, wherein connections (SS) between the sensor units and the analysis unit are wireless connections or wire-bound connections.

10. A method of positioning a moving object, using a transponder attachable to the moving object and a monitoring system having at least two sensor units, including the following method steps:
   emission of an infrared signal (IR-TC) by at least one of the two sensor units as a reaction to a start signal (S-TC);
   transmission of an ultrasound signal (US) using an ultrasound transmitter, which is part of the transponder, as a reaction to the infrared trigger signal (IR-TC);
   transmission of a stop signal (S-US) by each of the two sensor units to a control unit as a reaction to the received ultrasound signal (US);
   determination of the time differences between the start signal (S-TC) and the stop signals (S-US) by the control unit;
   conversion of the time differences into distance values (Dx) between the transponder and the sensor units, the distance values (Dx) corresponding to the travel times of the ultrasound signal (US); and
   determination of the position of the moving object.

11. The method of positioning according to claim 10, wherein the infrared trigger signal (IR-TC) includes a command code for transmitting the ultrasound signal (US) and/or an object identification number (IDx), the object identification number (IDx) preferably being selected from a list.

12. The method of positioning according to claim 11, wherein the transponder compares the object identification number (IDx) received through the infrared trigger signal (IR-TC) to its own object identification number, the ultrasound signal (US) being emitted only if the object identification numbers correspond.

13. The method of positioning according to claim 11, wherein the list is generated by the following method steps:
   the control unit emits search signals (S-IC) to the sensor units,
   an IR transmitter of at least one of the at least two sensor units emits an infrared search signal (IR-IC) as a reaction,
   the infrared search signaL (IR-IC) is received by one or more IR receivers, which are part of one or more transponders,
   one or more radio transmitters, which are part of one or more transponders, transmit a radio signal (HF-ID) having the corresponding object identification number (IDx) to a radio receiver as a reaction,
   the object identification numbers (IDx) received are entered into the list.

14. The method according to claim 10, wherein the distance values (Dx) are differentiated by a computing unit into real distance values, obtained through direct sight connection between transponder and sensor units, and unreal distance values, obtained through reflections, only real distance values being processed further by the computing unit.

15. The method according to claim 14, wherein the real distance values (Dx) obtained are used to calculate the position in a coordinate system, from multiple positions obtained, those having the smallest distance to the last known position being selected and transmitted to the visualization unit for representation.

* * * * *